United States Patent
Brockway et al.

(10) Patent No.: US 12,145,350 B2
(45) Date of Patent: Nov. 19, 2024

(54) FUNCTIONALIZED TEXTILE COMPOSITIONS AND ARTICLES

(71) Applicant: Nelumbo Inc., Hayward, CA (US)

(72) Inventors: Lance R. Brockway, Hayward, CA (US); David C. Walther, Hayward, CA (US); Josh Rafshoon, Hayward, CA (US)

(73) Assignee: NELUMBO INC., Hayward, CA (US)

( * ) Notice: Subject to any disclaimer, the term of this patent is extended or adjusted under 35 U.S.C. 154(b) by 26 days.

(21) Appl. No.: 17/784,464

(22) PCT Filed: Dec. 11, 2020

(86) PCT No.: PCT/US2020/064394
§ 371 (c)(1),
(2) Date: Jun. 10, 2022

(87) PCT Pub. No.: WO2021/119371
PCT Pub. Date: Jun. 17, 2021

(65) Prior Publication Data
US 2023/0002960 A1  Jan. 5, 2023

Related U.S. Application Data

(63) Continuation-in-part of application No. PCT/US2019/065978, filed on Dec. 12, 2019.
(Continued)

(51) Int. Cl.
*B32B 7/027* (2019.01)
*B32B 5/02* (2006.01)
(Continued)

(52) U.S. Cl.
CPC .............. *B32B 7/027* (2019.01); *B32B 5/024* (2013.01); *B32B 9/02* (2013.01); *B32B 17/02* (2013.01);
(Continued)

(58) Field of Classification Search
CPC ....... B32B 15/02; B32B 15/046; B32B 15/08; B32B 15/09; B32B 15/14; B32B 17/02; B32B 19/041; B32B 19/045; B32B 19/06; B32B 2250/03; B32B 2250/04; B32B 2250/05; B32B 2255/02; B32B 2255/06; B32B 2255/10; B32B 2255/20; B32B 2255/26; B32B 2255/28; B32B 2262/0261; B32B 2262/0276; B32B 2262/062; B32B 2262/08; B32B 2262/101; B32B 2262/103; B32B 2262/105; B32B 2262/128; B32B 2266/0214; B32B 2266/057; B32B 2305/188; B32B 2307/206; B32B 2307/304; B32B 2307/306; B32B 2307/3065; B32B 2307/50; B32B 2307/554; B32B 2307/70; B32B 2307/714; B32B 2307/7145; B32B 2307/724; B32B 2307/728; B32B 2307/73; B32B 2307/758; B32B 2315/02; B32B 2315/08; B32B 2317/10; B32B 2437/00; B32B 2535/00; B32B 2553/00; B32B 2571/00; B32B 2597/00; B32B 27/065; B32B 27/08; B32B 27/12; B32B 27/281; B32B 27/34; B32B 27/36; B32B 33/00; B32B 5/022; B32B 5/024; B32B 5/026; B32B 5/18; B32B 5/245; B32B 5/26; B32B 7/02; B32B 7/027; B32B 9/005; B32B 9/02; B32B 9/041; B32B 9/045; B32B 9/047; C04B 2235/3206; C04B 2235/3217; C04B 2235/3284; C04B 2235/96; C04B 35/04; C04B 35/10; C04B 35/453; C04B 38/0058; C04B 38/0064; C04B 38/0096; C08J 5/121; C09D 1/00; C09D 201/00;
(Continued)

(56) References Cited

U.S. PATENT DOCUMENTS

| | | |
|---|---|---|
| 8,540,889 B1 | 9/2013 | Hartlove et al. |
| 9,147,633 B2 | 9/2015 | Eid et al. |

(Continued)

FOREIGN PATENT DOCUMENTS

| | | |
|---|---|---|
| CN | 201575646 U | 9/2010 |
| CN | 102748987 A | 10/2012 |

(Continued)

OTHER PUBLICATIONS

Nagaraju, G et al.. Wearable Fabrics with Self-Branched Bimetallic Layered Double Hydroxide Coaxial Nanostructures for Hybrid Supercapacitors abstract; p. 10861, figure 1b; p. 10862, col. 1, second paragraph; p. 10863, figures 3(a)(i) and 3(b)(iii); p. 10864 col. 2, second paragraph; p. 10865, col. 1, first paragraph; p. 10866, col. 1, second paragraph. ACS Nano. 10.1021/acsnano.7b04368. Oct. 9, 2017; Entire Document.

Balaram, A et al.. "Enhanced Oxygen Evolution Reaction Electrocatalysis via Electrodeposited Amorphous-phase Nickel-Cobalt Hydroxide Nanodendrite Forests" abstract; p. 12, first paragraph. Applied Materials & Interfaces. 10.1021/acsami.7b05735. Aug. 1, 2017; Entire Document.

(Continued)

*Primary Examiner* — Hai Vo
(74) *Attorney, Agent, or Firm* — Fountainhead Law Group, PC; Jill A. Jacobson

(57) ABSTRACT

Functionalized textile materials are provided. At least a portion of a textile surface in includes a ceramic material, such as a binderless porous structured ceramic, and optionally, one or more functional layer is applied, resulting in a textile material with one or more desirable functional properties, such as hydrophilicity, hydrophobicity, flame retardancy, photocatalysis, anti-fouling, and/or deodorant properties.

16 Claims, No Drawings

Related U.S. Application Data

(60) Provisional application No. 63/039,965, filed on Jun. 16, 2020, provisional application No. 63/038,642, filed on Jun. 12, 2020, provisional application No. 63/038,693, filed on Jun. 12, 2020, provisional application No. 62/989,150, filed on Mar. 13, 2020, provisional application No. 62/989,092, filed on Mar. 13, 2020.

(51) Int. Cl.
| | |
|---|---|
| B32B 9/02 | (2006.01) |
| B32B 17/02 | (2006.01) |
| B32B 33/00 | (2006.01) |
| C04B 35/04 | (2006.01) |
| C04B 35/10 | (2006.01) |
| C04B 35/453 | (2006.01) |
| C04B 38/00 | (2006.01) |
| C08J 5/12 | (2006.01) |
| C09D 1/00 | (2006.01) |
| C09D 5/08 | (2006.01) |
| C09D 201/00 | (2006.01) |
| C23C 8/02 | (2006.01) |
| C23C 8/52 | (2006.01) |
| C23C 22/06 | (2006.01) |
| D06M 11/44 | (2006.01) |
| D06M 11/83 | (2006.01) |
| D06M 23/06 | (2006.01) |
| F28F 19/06 | (2006.01) |
| D06M 101/06 | (2006.01) |
| D06M 101/32 | (2006.01) |
| D06M 101/34 | (2006.01) |

(52) U.S. Cl.
CPC .............. *B32B 33/00* (2013.01); *C04B 35/04* (2013.01); *C04B 35/10* (2013.01); *C04B 35/453* (2013.01); *C04B 38/0058* (2013.01); *C04B 38/0064* (2013.01); *C04B 38/0096* (2013.01); *C08J 5/121* (2013.01); *C09D 1/00* (2013.01); *C09D 5/08* (2013.01); *C09D 201/00* (2013.01); *C23C 8/02* (2013.01); *C23C 8/52* (2013.01); *C23C 22/06* (2013.01); *D06M 11/44* (2013.01); *D06M 11/83* (2013.01); *D06M 23/06* (2013.01); *F28F 19/06* (2013.01); *B32B 2255/20* (2013.01); *B32B 2262/08* (2013.01); *B32B 2262/101* (2013.01); *B32B 2262/128* (2021.05); *B32B 2305/188* (2013.01); *B32B 2307/304* (2013.01); *B32B 2307/728* (2013.01); *B32B 2307/73* (2013.01); *B32B 2315/02* (2013.01); *B32B 2315/08* (2013.01); *B32B 2317/10* (2013.01); *C04B 2235/3206* (2013.01); *C04B 2235/3217* (2013.01); *C04B 2235/3284* (2013.01); *C04B 2235/96* (2013.01); *D06M 2101/06* (2013.01); *D06M 2101/32* (2013.01); *D06M 2101/34* (2013.01); *D06M 2200/12* (2013.01)

(58) Field of Classification Search
CPC .. C09D 5/08; C23C 22/06; C23C 8/02; C23C 8/52; D06M 11/44; D06M 11/45; D06M 11/46; D06M 11/83; D06M 17/00; D06M 2101/06; D06M 2101/32; D06M 2101/34; D06M 2200/12; D06M 23/06; D06M 23/08; F28F 19/02; F28F 19/06; F28F 2245/04
See application file for complete search history.

(56) References Cited

U.S. PATENT DOCUMENTS

| | | |
|---|---|---|
| 9,362,201 B2 | 6/2016 | Gavillet et al. |
| 2002/0187335 A1 | 12/2002 | Kelley et al. |
| 2004/0055892 A1 | 3/2004 | Oh et al. |
| 2004/0118698 A1 | 6/2004 | Lu et al. |
| 2006/0141268 A1 | 6/2006 | Kalkan et al. |
| 2006/0257642 A9 | 11/2006 | Mikhael et al. |
| 2008/0190841 A1* | 8/2008 | Pascaly .............. H01M 50/491 264/483 |
| 2010/0099012 A1 | 4/2010 | Adzic |
| 2010/0203287 A1 | 8/2010 | Jiang et al. |
| 2010/0252241 A1 | 10/2010 | McDermott et al. |
| 2010/0294475 A1 | 11/2010 | Rush |
| 2011/0039972 A1 | 2/2011 | Bauer |
| 2011/0198059 A1 | 8/2011 | Gavillet et al. |
| 2011/0253007 A1 | 10/2011 | Zastrau et al. |
| 2012/0231290 A1 | 9/2012 | Ho et al. |
| 2012/0328505 A1 | 12/2012 | Frei et al. |
| 2013/0074528 A1 | 3/2013 | Graaf et al. |
| 2013/0244001 A1 | 9/2013 | Wang et al. |
| 2013/0294002 A1* | 11/2013 | Thompson .............. B32B 5/026 361/212 |
| 2013/0330501 A1 | 12/2013 | Aizenberg et al. |
| 2014/0011013 A1 | 1/2014 | Jin et al. |
| 2014/0017456 A1 | 1/2014 | Xiao et al. |
| 2014/0178641 A1 | 6/2014 | Leblanc et al. |
| 2014/0182790 A1 | 7/2014 | Hwang et al. |
| 2014/0208978 A1 | 7/2014 | Sunder et al. |
| 2014/0231052 A1 | 8/2014 | Takasawa et al. |
| 2014/0238646 A1 | 8/2014 | Enright |
| 2014/0247556 A1 | 9/2014 | Eid et al. |
| 2014/0356574 A1 | 12/2014 | Conolly et al. |
| 2015/0175317 A1 | 6/2015 | Imai et al. |
| 2016/0068703 A1 | 3/2016 | Schmidt et al. |
| 2016/0097606 A1 | 4/2016 | Xiao et al. |
| 2016/0193597 A1* | 7/2016 | Wolff ..................... B01J 27/224 502/178 |
| 2017/0282416 A1 | 10/2017 | Kim et al. |

FOREIGN PATENT DOCUMENTS

| | | |
|---|---|---|
| CN | 103173832 A | 6/2013 |
| CN | 104451814 A | 3/2015 |
| CN | 105776125 A | 7/2016 |
| CN | 105776317 A | 7/2016 |
| EP | 2752504 B1 | 4/2016 |
| KR | 20190033143 | 3/2019 |
| KR | 102031824 B1 | 10/2019 |
| TW | I664017 B | 7/2019 |
| WO | 2014/012052 A1 | 1/2014 |
| WO | 2017031391 A1 | 2/2017 |
| WO | 2017173124 A1 | 10/2017 |
| WO | 2018/053452 A1 | 3/2018 |
| WO | 2018053453 A1 | 3/2018 |
| WO | 2018/132519 A1 | 7/2018 |
| WO | 2019003898 A1 | 1/2019 |
| WO | 2020123804 A1 | 6/2020 |

OTHER PUBLICATIONS

International Search Report in corresponding International Patent Application No. PCT/US2020/064394, mailed Apr. 8, 2021, 4 pages.
Miljkovic, N., et al., Jumping-Droplet-Enhanced Condensation on Scalable Superhydrophobic Nanostructured Surfaces, 2013, Nano Lett. 13:179-187.
Miljkovic, N., et al., Modeling and Optimization of Superhydrophobic Condensation, 2013, J. Heat Transf.-Trans. ASME 135:14.
Miljkovic, N., et al., Condensation heat transfer on superhydrophobic surfaces, 2013, MRS Bull. 38:397-406.
Aili, A., et al., Characteristics of Jumping Droplet-Enhanced Condensation on Nanostructured Micromesh Surface, 2016, ASME International Conference on Micro/Nanoscale Heat and Mass Transfer, V001T004A001.

(56) References Cited

OTHER PUBLICATIONS

Kang, S.M., et al., Directional Oil Sliding Surfaces with Hierarchical Anisotropic Groove Microstructures, Aug. 5, 2013, Adv. Mater. 25(40):5756-5761.

Tuteja, A., et al., Design Parameters for Superhydrophobicity and Superoleophobicity, Jan. 1, 2011, MRS Bulletin 33 (8):752-758.

Lv, Y., et al., Fabrication of Superhydrophobic Films on Aluminum Foils with Controllable Morphologies, Jan. 11, 2013, Adv. Mat. Res., 641-642:414-417.

Mozalev, A., et al., The superhydrophobic properties of self-organized microstructured surfaces derived from anodically oxidized Al/Nb and Al/Ta metal layers, 2012, Electrochimica Acta 82:90-97.

Wang, Z., et al., In situ growth of hierarchical boehmite on 2024 aluminum alloy surface as superhydrophobic materials, 2014, RSC Adv. 4:14708-14714.

Zhao, J., et al., CoMn-layered double hydroxide nanowalls supported on carbon fibers for high-performance flexible energy storage devices, 2013, J. Mater. Chem. A, 1:8836-8843.

Gao, L., et al., High-performance energy storage devices based on WO3 nanowire arrays/carbon cloth interated electrodes, 2013, J. Mater. Chem. A, 1:7167-7173.

Liu, J., et al., Layered Double Hydroxide Nano- and Microstructures Grown Directly on Metal Substrates and Their Calcined Products for Application as Li-Ion Battery Electrodes, 2008, Adv. Funct. Mater. 18:1448-1458.

Zhang, F., et al., Corrosion Resistance of the Superhydrophobic Mg(OH)2/Mg—Al Layered Double Hydroxide Coatings on Magnesium Alloys, 2016, Metals 6:85.

Liu, J., et al., Facile and Large-Scale Production of ZnO/Zn—Al Layered Double Hydroxide Hierarchical Heterostructures, 2006, Phys. Chem. B 110: 21865-21872.

Chen, H. et al., In Situ Microstructure Control of Oriented Layered Double Hydroxide Monolayer Films with Curved Hexagonal Crystals as Superhydrophobic Materials, 2006, Adv. Mater. 18:3089-3093.

\* cited by examiner

FUNCTIONALIZED TEXTILE COMPOSITIONS AND ARTICLES

CROSS-REFERENCE TO RELATED APPLICATIONS

This application is a U.S. National Phase application under 37 CFR § 371 of PCT Application No. PCT/US2020/064394, filed on Dec. 11, 2020, which claims priority to PCT Application No. PCT/US2019/065978, filed on Dec. 12, 2019, and claims the benefit of U.S. Provisional Application No. 62/989,092, filed on Mar. 13, 2020, 62/989,150, filed on Mar. 13, 2020, 63/038,642, filed on Jun. 12, 2020, 63/038,693, filed on Jun. 12, 2020, and 63/039,965, filed on Jun. 16, 2020, all of which are incorporated herein by reference in their entireties.

FIELD OF THE INVENTION

The invention relates to textiles that include a ceramic material, in particular, a binderless ceramic, such as a metal oxide and/or metal hydroxide ceramic, on the textile surface. The textiles are modified to include one or more functionality that provides enhanced properties in an application or environment of use.

BACKGROUND

The functionalization of textile surfaces provides desired benefits in terms of textile performance. In order to deliver textile materials that are resistant to a variety of environmental conditions and provide significant performance enhancement, new textile compositions must be developed. Desirable performance characteristics may be provided by functionalization of the textile surface.

SUMMARY OF THE INVENTION

Compositions are provided herein that include functionalized ceramic materials on porous substrates.

In one aspect, compositions are provided that include a binderless ceramic material on a porous substrate, such as a textile or filter material. In one embodiment, the substrate includes pores with a mean pore diameter that is less than about 250 μm, and the ceramic material on the substrate does not substantially change the mean pore diameter of the substrate. In another embodiment, the substrate includes pores with a mean pore diameter that is less than about 250 μm, and the ceramic material on the substrate partially or completely fills the pores of the substrate, thereby reducing the mean pore diameter or eliminating the pores of the substrate, respectively. In some embodiments, the substrate has an air permeability of about 0.1 cubic feet per minute (CFM) to about 100 CFM, according to ASTM D737, prior to deposit of the ceramic material on the substrate.

In some embodiments, the ceramic material is primarily crystalline. In some embodiments, the ceramic material includes a metal oxide, a hydrate of a metal oxide, a metal hydroxide, and/or a hydrate of a metal hydroxide. In some embodiments, the ceramic material includes a metal hydroxide, and at least a portion of the metal hydroxide comprises layered double hydroxide. In some embodiments, the ceramic material is a structured ceramic material, such as a nanostructured ceramic material.

In some embodiments, the ceramic material includes a transition metal, a Group II element, a rare-earth element, aluminum, tin, or lead. For example, the ceramic material may include one or more of zinc, aluminum, manganese, magnesium, cerium, copper, gadolinium, tungsten, tin, zinc, lead, and cobalt. In certain embodiments, the ceramic material includes: a mixture of zinc and aluminum oxides and/or hydroxides; a mixture of manganese and magnesium oxides and/or hydroxides; manganese oxide and/or hydroxide; aluminum oxide and/or hydroxide; a mixed metal manganese oxide and/or hydroxide; a mixture of magnesium and aluminum oxides and/or hydroxides; magnesium oxide and/or hydroxide; a mixture of magnesium, cerium, and aluminum oxides and/or hydroxides; a mixture of zinc, praseodymium, and aluminum oxides and/or hydroxides; a mixture of cobalt and aluminum oxides and/or hydroxides; a mixture of manganese and aluminum oxides and/or hydroxides; a mixture of cerium and aluminum oxides and/or hydroxides; a mixture of copper and aluminum oxides and/or hydroxides; a mixture of zinc and aluminum oxides and/or hydroxides; a mixture of Zn-aluminates; a mixture comprising one or more phases comprising Zn, Al and oxygen; zinc oxide and/or hydroxide; or a hydrate of any of the above compounds or mixtures thereof.

In some embodiments, the ceramic material includes a thickness up to about 25 μm, such as a thickness of about 0.2 μm to about 25 μm.

In some embodiments, the ceramic material comprises porosity of about 5% to about 80%, such as greater than about 10%, or about 30% to about 95%.

In some embodiments, the porous substrate comprises or consists of a woven material, a knitted material, a nonwoven fabric or textile, or paper. The porous substrate may comprise or consist of, for example, polyamide, polyester, cotton, wool, polyethylene, polypropylene, a cellulosic material, an aramid, polyurethane, activated carbon, fiberglass, a steel alloy, a brass alloy, an aluminum alloy, aluminum, or copper. In various embodiments, the porous substrate may be a textile material that comprises or consists of natural fibers, synthetic fibers, metal mesh, or metal cloth, or a combination thereof. In some embodiments, the textile surface has been oxidized, ashed, or activated, e.g., prior to deposit of the ceramic material on the substrate. In an embodiment, the substrate is a metallized textile that includes one or more metal on the textile surface, such as, but not limited to, aluminum, iron, nickel, titanium, alloys of stainless steel or copper.

In some embodiments, the ceramic material and/or an optional top coat (functional layer) material, imparts one or more functional property to the composition, such as, but not limited to, hydrophilicity, hydrophobicity, flame retardancy, photocatalysis, anti-fouling, deodorant properties, inhibition of microbial growth, ice or condensate management, anti-ice, anti-frost, superhydrophobicity, superhydrophilicity, corrosion resistance, electromagnetic modulation, thermal modulation, breathability, dynamic wind resistance, and/or color. In certain embodiments, two or more of such functional properties are imparted to a single layer of the composition (e.g., a single layer of textile, fabric, or filter material).

In some embodiments, the ceramic material is further modified by a functional layer. In some embodiments, a functional layer (e.g., top coat) material imparts one or more functional property that is of greater magnitude than the same functional property imparted by an identical top coat material deposited directly on an identical textile surface that does not comprise the ceramic material. For example, the ceramic material and the functional layer material may synergistically impart one or more functional property that is of greater magnitude than the same functional property imparted by either the ceramic material or the functional layer material deposited independently on an identical textile surface.

In some embodiments, the functional layer imparts a hydrophobic property. For example, the functional layer that imparts a hydrophobic property to the composition may include a fluoropolymer, an elastomer, a plastic, or a molecule with a head group and a tail group, for example, wherein the head group includes a silane group, a phosphonate group, a phosphonic acid group, a carboxylic acid group, a vinyl group, an alcohol group, a hydroxide group, a thiolate group, and/or a thiol group, and wherein the tail group includes a hydrocarbon group, a fluorocarbon group, a vinyl group, a phenyl group, an epoxide group, an acrylic group, an acrylate group, a hydroxyl group, a carboxylic acid group, a thiol group, and/or a quaternary ammonium group.

In some embodiments, the ceramic material on the substrate is a partially filled porous structure. For example, the pores may be partially filled with a second ceramic material or with a molecule with a head group and a tail group.

In some embodiments, the composition exhibits greater adherence to small molecules than to biomolecules or components from sebum, such as, but not limited to, triglycerides, wax esters, squalene, and/or free fatty acids.

In some embodiments, the composition possesses a photocatalytic property, and materials that adhere to the surface are photocatalytically degraded upon exposure to light.

In some embodiments, the composition exhibits greater adherence to a durable water repellent substance than an identical substrate that does not comprise the ceramic material.

In another aspect, articles are provided that include any of the compositions (compositions that include functionalized ceramic materials on porous substrates) described herein. In certain nonlimiting embodiments, articles include filters, membranes, clothing, outerwear, camping gear, pipe insulation, carpet, car seats, upholstery, bedding, architectural surfaces (e.g., wall sheathing, floor sheathing, or siding), and window coverings.

In some embodiments, compositions or articles as described herein can withstand a hydrostatic pressure greater than about 1 kPa.

In some embodiments, compositions or articles as described herein include a moisture vapor transmission rate greater than about 80% of the vapor transmission rate of an identical substrate that is not modified with the ceramic material (and in some embodiments optional functional layer).

In some embodiments, compositions or articles as described herein includes a sessile drop water contact angle greater than about 150 degrees.

In some embodiments, compositions or articles as described herein include a manganese oxide ceramic, and an alkylsilane or alkylphosphonate functional layer.

DETAILED DESCRIPTION

Compositions are provided herein that include a ceramic material, such as a binderless ceramic material, on a porous substrate, such as a textile. In some embodiments, the substrate includes pores with a mean pore diameter less than about 250 μm, and the ceramic does not substantially change the mean pore diameter of the substrate. In other embodiments, the substrate includes pores with a mean pore diameter less than about 250 μm, and the ceramic partially or completely fills the pores, thereby reducing the mean pore diameter or eliminating the pores of the substrate, respectively.

Technical textiles are provided, which include desirable functional properties such as, but not limited to, hydrophilicity, hydrophobicity, flame retardancy, photocatalysis, antifouling, deodorant properties, inhibition of microbial growth, ice or condensate management, anti-ice, anti-frost, superhydrophobicity, superhydrophilicity, corrosion resistance, electromagnetic modulation, thermal modulation, breathability, dynamic wind resistance, and/or color, imparted by the composition as described herein on the textile surface. In some embodiments, a single layer of the textile includes two or more of such functional properties, imparted by the composition as described herein (ceramic material) on the textile surface.

Ceramic, e.g., porous ceramic (e.g., metal oxide and/or metal hydroxide) surface modification compositions are deposited on a textile surface. In some embodiments, a ceramic, e.g., structured ceramic, is deposited onto the substrate surface, and a functional layer (e.g. top coat) which provides one or more functional property is deposited or applied on the ceramic material.

The compositions are provided as binderless surface modification material on the surface of a substrate, such as a textile, for example, a surface-immobilized ceramic material. In some embodiments, the ceramic material includes a metal oxide and/or hydroxide ceramic, for example, a single metal or mixed metal oxide and/or hydroxide ceramic. In some embodiments, the ceramic material includes a metal hydroxide and/or hydroxide ceramic, for example, a single metal or mixed metal oxide and/or hydroxide ceramic. In some embodiments, the ceramic material includes a metal oxide and a metal hydroxide ceramic, wherein the metal oxide and the metal hydroxide include the same or different single metal or mixed metal. In some embodiments, the ceramic material includes a metal oxide and/or a metal hydroxide ceramic, wherein the substrate is hydrated by water or other compounds resulting in a change of surface energy and potentially the ratio of metal oxide to metal hydroxide composition of the ceramic. In some embodiments, the ceramic material includes a metal hydroxide, wherein at least a portion of the metal hydroxide is in the form of a layered double hydroxide, e.g., at least about 5%, 10%, 15%, 20%, 25%, 30%, 35%, 40%, 45%, 50%, 55%, 60%, 65%, 70%, 75%, 80%, 85%, 90%, or 95% of the metal hydroxide is layered double hydroxide.

In some embodiments of the compositions described herein, a "metal oxide" or "metal hydroxide" may be in the form of a hydrate of a metal oxide or metal hydroxide, respectively, or a portion of the metal oxide or metal hydroxide may be in the form of a hydrate of a metal oxide or metal hydroxide, respectively.

A mixed metal oxide or mixed metal hydroxide may include, for example, oxides or hydroxides, respectively, of more than one metal, such as, but not limited to, iron, cobalt, nickel, copper, manganese, chromium, titanium, vanadium, zirconium, molybdenum, tantalum, zinc, lead, tin, tungsten, cerium, praseodymium, samarium, gadolinium, lanthanum, magnesium, aluminum, or calcium.

The surface modification materials (e.g., binderless porous ceramic materials) described herein are deposited onto a substrate (e.g., produced by reaction with a metal on the substrate surface) without a binder. In some embodiments, a surface modification material as described herein is immobilized on the substrate.

In some embodiments, the ceramic material is a structured, such as nanostructured, ceramic material.

Nonlimiting examples of binderless ceramic surface modification materials are provided in PCT Application No. PCT/US19/65978, which is incorporated by reference herein in its entirety.

Definitions

Numeric ranges provided herein are inclusive of the numbers defining the range.

"A," "an" and "the" include plural references unless the context clearly dictates otherwise.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc."

"Binder" or binding agent is any material or substance that holds or draws other materials together to form a cohesive whole mechanically, chemically, by adhesion or cohesion.

"Binderless" refers to absence of a binder, particularly with regard to an organic binder or resin (e.g., polymers, glues, adhesives, asphalt) or inorganic binder (e.g., lime, cement glass, gypsum, etc.) which is added specifically to maintain structural integrity of the material in question.

A "capping agent" refers to a compound or agent that slows crystal growth and permits modulation of the morphology of the nanosurface.

"Ceramic" refers to a solid material comprising an inorganic compound of metal, non-metal, or ionic and covalent bonds.

"Fabric" refers to a nonwoven material that may be constructed from fibers, and bonded together by chemical, mechanical, heat, and/or solvent treatment. Fabric may include, for example, felt, and other materials that are neither woven nor knitted.

A "fiber" refers to a thread or filament from which a textile may be formed

"Hydrophilic" refers to a surface that has a high affinity for water. Contact angles can be very low and/or immeasurable.

"Layered double hydroxide" refers a class of ionic solids characterized by a layered structure with the generic sequence [AcB Z AcB]$_n$, where c represents layers of metal cations, A and B are layers of hydroxide anions, and Z are layers of other anions and/or neutral molecules (such as water). Layered double hydroxides are also described in PCT Application No. PCT/US2017/052120, which is incorporated by reference herein.

A "nanostructured" composition refers herein to a composition that has a feature in at least one dimension that is less than 100 nanometers.

"Permeability" in fluid mechanics is a measure of the ability of a porous material to allow fluids to pass through it. The permeability of a medium is related to the porosity, but also to the shapes of the pores in the medium and their level of connectedness.

"Pore size distribution" refers to the relative abundance of each pore diameter or range or pore diameters as determined by mercury intrusion porosimetry (MIP) and Washburn's equation.

"Porosity" is a measure of the void (i.e., "empty") spaces in a material, and is a fraction of the volume of voids over the total volume, between 0 and 1, or as a percentage between 0% and 100%. Porosity may be measured by mercury intrusion porosimetry.

"Porous" refers to spaces, holes, or voids within a solid material.

"Superhydrophobic" refers to a surface that is extremely difficult to wet with water. The contact angle of a water droplet on a superhydrophobic material here a superhydrophobic surface refers to contact angles >150°. Highly hydrophobic contact angles are >120°.

"Surface area per square meter of projected substrate area" refers to the actual measured surface area, usually measured in square meters, divided to the surface area of the substrate if it were atomically smooth (no surface roughness), also typically in square meters.

"Synergy" or "synergistic" refers to the interaction or cooperation between two or more substances, materials, or agents to produce a combined effect that is greater (positive synergy) or lesser (negative synergy) than the sum of theft separate, individual effects.

"Textile" refers to a flexible material consisting of a network of natural or artificial fibers. For example, a textile material may be created by joining fibers or groups of fibers through knitting, weaving, felting, tufting, or bonding, where fiber encompasses both natural and synthetic forms of all lengths including metal fibers. Textiles also include ropes and cords.

"Thickness" refers to the length between the surface of the substrate and the top of the surface modification (e.g., ceramic) material.

"Tunable" refers to the ability of a function, characteristic, or quality of a material to be changed or modified.

"Vapor transmission rate" refers to the mass of vapor per unit area per unit time that passes through a layer in the direction orthogonal to the plane of the layer.

"Water column breakthrough pressure" refers to the specific height of a vertical column of water at which the hydrostatic pressure experienced by the layer at the bottom of the water column overcomes the ability of the layer to support the water column resulting in the water flowing through the layer.

Substrates

Porous materials, such as textile materials or fabric, serve as substrates for deposit of a ceramic material as described herein. For example, the substrate may be composed of a woven material, a knitted material, a nonwoven fabric or textile, or paper. The substrate may include natural fibers, synthetic fibers, metal mesh, or metal cloth, or a combination thereof. In certain nonlimiting embodiments, the substrate comprises or consists of a polymer (e.g., polyamide (e.g., nylon), polyester, polyethylene, polypropylene, polyurethane), a cellulosic material (e.g., rayon), cotton, wool, aramid, activated carbon, fiberglass, an alloy (e.g., steel, brass, or aluminum alloy), or a metal (e.g., aluminum, copper).

In some embodiments, the textile substrate is a metallized textile. A metallized textile includes one or more metal, such as, but not limited to, aluminum, iron, nickel, titanium, or copper, or a combination thereof, on the textile surface. In one embodiment, the metallized textile is metallized with aluminum. The thickness of metal on the textile surface may be about 25 nm to about 2000 nm, about 25 nm to about 100 nm, about 50 nm to about 250 nm, about 100 nm to about 500 nm, about 500 nm to about 1000 nm, about 1000 nm to about 2000 nm, about 750 nm to about 1500 nm, about 100 nm to about 2000 nm, or about 500 nm to about 2000 nm.

In some embodiments the substrate is oxidized, activated or ashed prior to the deposition of an interconnected ceramic material. In some embodiments this oxidation step is performed by submerging the substrate in an oxidizer. In some embodiments, the oxidizer includes persulfates, permanganates, nitrates, or peroxides. In some embodiments the oxidizer bath is heated. In some embodiments potassium persulfate, potassium permanganate, or hydrogen peroxide is used to oxidize the surface. In some embodiments, the substrate is oxidized, activated, or ashed using UV/ozone or a plasma. In some embodiments, an oxygen plasma is used to oxidize and/or activate the surface.

In some embodiments the air permeability of the substrate according to ASTM D737 is about 0.1 cubic feet per minute (CFM) to about 100 CFM. In other embodiments, the air permeability is about 0.5 CFM, about 1 CFM, about 2 CFM, about 5 CFM, about 10 CFM, about 20 CFM, about 30 CFM, about 40 CFM, about 50 CFM, about 60 CFM, about 70 CFM, about 80 CFM, about 90 CFM, or about 100 CFM. In other embodiments the air permeability is about 1 CFM to about 5 CFM or about 1 CFM to about 20, about 0.1 CFM to about 0.5 CFM, about 20 CFM to about 50 CFM, or about 50 CFM to about 100 CFM. In some embodiments the ceramic material or functionalization material does not change the air permeability by more than about 20%.

Functionalization

Porous substrates as described herein are functionalized produce compositions (e.g., technical textiles or filter materials) that include one or more desirable functional property. Such functional properties may include, but are not limited to, hydrophobicity, inhibition of or resistance to microbial growth, flame retardancy, hydrophilicity, resistance to corrosion, ice or condensate management, anti-ice, anti-frost, superhydrophobicity, superhydrophilicity, corrosion resistance, electromagnetic modulation, thermal modulation, breathability, dynamic wind resistance, and/or color, or combinations thereof.

In some embodiments, a functionalized substrate (e.g., textile) as described herein does not include fluorocarbon chemicals. In some embodiments, a functionalized substrate (e.g., textile) produced as described herein includes multiple desirable properties (functionalities) in a single layer of the substrate. In some embodiments, a functionalized substrate (e.g., textile) produced as described herein includes a functionalized structured ceramic on a textile substrate that includes natural or synthetic fibers.

In some embodiments, the ceramic that is deposited on the substrate may be designed with a desired porosity or open fraction that can be used to impart functional characteristics, as well as providing a binding surface for the deposit of structured ceramic material.

In some embodiments, one or more functional layer, such as a top coat material, is applied to the structured ceramic material, to impart desired functional properties to the textile material. One or more functional properties may be imparted by the structured ceramic and/or by the applied top coat material. Nonlimiting examples of functionalities imparted to textiles by the methods described herein include hydrophobicity, inhibition of microbial growth, flame retardancy, hydrophilicity, resistance to corrosion, ice or condensate management, anti-ice, anti-frost, superhydrophobicity, superhydrophilicity, inhibition of microbial growth, corrosion resistance, electromagnetic modulation, thermal modulation, breathability, dynamic wind resistance, odor resistance or elimination (e.g., deodorant properties), and/or color, and combinations thereof. In some embodiments, multiple functionalities are imparted to a single layer of the textile material (i.e., multifunctional single layer textile).

In some embodiments, the functionality imparted by the top coat material applied or deposited on the ceramic as described herein is enhanced relative to the functionality of the identical material applied or deposited on an identical substrate that does include the ceramic. In some embodiments, the ceramic material and the top coat material synergistically impart one or more functional property that is of greater magnitude than the same functional property imparted by either the ceramic material or the top coat material deposited independently on an identical substrate surface.

In some embodiments, a hydrophobic functionality is provided by stearic acid or Scotchgard™ (3M). In some embodiments, an anti-microbial functionality is provided by SmartShield Antimicrobial Protective Spray (Sylvane). In some embodiments, a flame retardancy functionality is provided by No Burn 1005 Fabric Fire Protection (No-Burn, Inc.) or a halon containing compound. In some embodiments, a hydrophilic functionality is provided by polyvinylpyrrolidone (PVP), polyurethane, polyacrylic acid (PAA), polyethylene oxide (PEO), or a polysaccharide material.

In certain nonlimiting embodiments, the top coat may include a paint, a paint binder, hydrophobic material, a hydrophilic material, a metal or metal-containing compound, or an antimicrobial agent.

In some embodiments, the ceramic surface modification material is a partially filled porous structure. For example, the pores may be partially filled with a second ceramic material (e.g., a ceramic material that is different from the binderless porous ceramic material) or with a molecule with a head group and a tail group, for example, wherein the head group includes a silane group, a phosphonate group, a phosphonic acid group, a carboxylic acid group, a vinyl group, an alcohol group, a hydroxide group, a thiolate group, a thiol group, and/or an ammonium group (e.g., a quaternary ammonium group), and wherein the tail group includes a hydrocarbon group, a fluorocarbon group, a vinyl group, a phenyl group, an epoxide group, an acrylic group, an acrylate group, a hydroxyl group, a carboxylic acid group, a thiol group, and/or a quaternary ammonium group.

In some embodiments, a top coat is a surface modifying top coating which reduces the viscous drag of an external or internal fluid on the surface. In some embodiments, a coating is deposited onto a surface that includes a nanostructured coating composition and a surface modifying top coating which reduces the viscous drag of an external or internal fluid on the surface and further includes additional benefits such as corrosion resistance, fouling resistance, self cleaning, heat transfer characteristics, optical characteristics, chemical inertness, other useful properties or combinations of properties.

In some embodiments, a top coat is or contains an antimicrobial agent. For example, an antimicrobial agent may be a charge transfer compound or agent that disrupts movement of ions across a cell membrane, for example, a quarternary amine. In some embodiments, the antimicrobial agent is a beta-lactam, an aminoglycoside, a tetracycline, a chloramphenicol, a macrolide, a lincosamide, a sulfonamide, a quinolone, a polyene, an azole, or a griseofulvin.

In some embodiments, a top coat is or contains a paint binder. For example, the paint binder may be an alkyd, an acrylic, a vinyl-acrylic, a vinyl acetate/ethylene (VAE), a polyurethane, a polyester, a silicone, a polyol, a melamine resin, a wax, an epoxy, a silane, or an oil.

Ceramic Materials

A ceramic material, such as a structured ceramic material, as described herein is deposited on at least a portion of the surface of the porous substrate. In some embodiments, the ceramic material is a nanostructured ceramic material. In some embodiments, the ceramic material is porous. In some embodiments, the ceramic material is a binderless ceramic material, such as a binderless nanostructured ceramic material. In some embodiments, the ceramic material is a binderless porous ceramic material, such as a binderless porous nanostructured ceramic material.

In some embodiments, the ceramic material includes: a surface area of about 1.5 $m^2$ to 100 $m^2$, about 10 $m^2$ to about 1500 $m^2$, or about 70 $m^2$ to about 1000 $m^2$ per square meter of projected substrate area; a surface area of about 15 $m^2$ to about 1500 $m^2$, or about 50 $m^2$ to about 700 $m^2$ per gram of ceramic material; mean pore diameter of about 5 nm to about 200 nm, about 2 nm to about 20 nm, or about 4 nm to about 11 nm; thickness up to about 100 micrometers, up to about 50 micrometers, up to about 25 micrometers, up to about 20 micrometers, or about 0.2 micrometers to about 25 micrometers; a porosity of about 5% to about 95%, about 10% to about 90%, about 30% to about 70%, about 30% to about 95%, or greater than about 10%; a void volume of about 100 $mm^3/g$ to about 7500 $mm^3/g$ as determined by mercury intrusion porosimetry; or any combination thereof.

In some embodiments, the ceramic material (e.g., metal oxide, metal hydroxide, and/or hydrates thereof) includes one or more of zinc, aluminum, manganese, magnesium, cerium, copper, gadolinium, tungsten, tin, lead, and cobalt. In some embodiments, the ceramic material includes a transition metal, a Group II element, a rare-earth element (e.g., lanthanum, cerium gadolinium, praseodymium, scandium, yttrium, samarium, or neodymium), aluminum, tin, zinc, or lead.

In some embodiments, the ceramic surface modification material includes a thickness of about 0.5 or 1 to about 100 micrometers, or about 0.5 micrometers to about 20 micrometers, or a thickness up to about 50 micrometers, or up to about 25 micrometers. In some embodiments, the binderless porous ceramic material includes a thickness of about 0.2 micrometers to about 25 micrometers. In some embodiments, the thickness is any of at least about 0.2, 0.5, 1, 2, 3, 4, 5, 6, 7, 8, 9, 10, 11, 12, 13, 14, 15, 16, 17, 18, 19, 20, 21, 22, 23, 24, or 25 micrometers. In some embodiments, the thickness is any of about 0.2 to about 0.5, about 0.5 to about 1, about 1 to about 5, about 3 to about 7, about 5 to about 10, about 7 to about 15, about 10 to about 15, about 12 to about 18, about 15 to about 20, about 18 to about 25, about 0.5 to about 15, about 2 to about 10, about 1 to about 10, about 3 to about 13, about 0.5 to about 15, about 0.5 to about 5, about 0.5 to about 10, or about 5 to about 15 micrometers.

In some embodiments, the ceramic surface modification material includes a surface area of about 1.1 $m^2$ to about 100 $m^2$ per square meter of projected substrate area. In some embodiments, the binderless porous ceramic material includes a surface area of about 10 $m^2$ to about 1500 $m^2$ per square meter of projected substrate area. In some embodiments, the surface area is any of at least about 10, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, or 1500 $m^2$ per square meter of projected substrate area. In some embodiments, the surface area is any of about 10 to about 100, about 50 to about 250, about 150 to about 500, about 250 to about 750, about 500 to about 1000, about 750 to about 1200, about 1000 to about 1500, about 70 to about 1000, about 150 to about 800, about 500 to about 900, or about 500 to about 1000 $m^2$ per square meter of projected substrate area.

In some embodiments, the ceramic material includes a surface area of about 15 $m^2$ to about 1500 $m^2$ per gram of ceramic material. In some embodiments, the surface area is any of at least about 15, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, or 1500 $m^2$ per gram of ceramic material. In some embodiments, the surface area is any of about 15 to about 100, about 50 to about 250, about 150 to about 500, about 250 to about 750, about 500 to about 1000, about 750 to about 1200, about 1000 to about 1500, about 50 to about 700, about 75 to about 600, about 150 to about 650, or about 250 to about 700 $m^2$ per gram of ceramic material.

In some embodiments, the ceramic surface modification material is porous and includes mesoporous mean pore sizes that range from about 2 nm to about 50 nm. In other embodiments, the mean pore sizes range from about 50 nm to about 1000 nm. In some embodiments, the binderless porous ceramic material includes a mean pore diameter of about 2 nm to about 20 nm. In some embodiments, the mean pore diameter is any of at least about 2, 3, 4, 5, 6, 7, 8, 9, 10, 11, 12, 13, 14, 15, 16, 17, 18, 19, or 20 nm. In some embodiments, the mean pore diameter is any of about 2 to about 5, about 4 to about 9, about 5 to about 10, about 7 to about 12, about 9 to about 15, about 12 to about 18, about 15 to about 20, about 4 to about 11, about 5 to about 9, about 4 to about 8, or about 7 to about 11 nm.

In some embodiments, the ceramic surface modification material is porous, with a porosity of about 5% to about 95%. In some embodiments, the porosity may be any of at least about or greater than about 5%, 10%, 15%, 20%, 25%, 30%, 35%, 40%, 50%, 55%, 60%, 65%, 70%, 75%, 80%, 85%, 90%, or 95%. In some embodiments, the porosity is about 10% to about 90%, about 30% to about 90%, about 40% to about 80%, or about 50% to about 70%.

In some embodiments, the ceramic surface modification material is porous, with a permeability of about 1 to 10,000 millidarcy. In some embodiments, the permeability may be any of at least about 1, 10, 100, 500, 1000, 5000, or 10,000 millidarcy. In some embodiments, the permeability is about 1 to about 100, about 50 to about 250, about 100 to about 500, about 250 to about 750, about 500 to about 1000, about 750 to about 2000, about 1000 to about 2500, about 2000 to about 5000, about 3000 to about 7500, about 5000 to about 10,000, about 1 to about 1000, about 1000 to about 5000, or about 5000 to about 10,000 millidarcy.

In some embodiments, the ceramic material is porous and includes a void volume of about 100 $mm^3/g$ to about 7500 $mm^3/g$, as determined by mercury intrusion porosimetry. In some embodiments, the void volume is any of at least about 100, 200, 300, 400, 500, 600, 700, 800, 900, 1000, 1500, 2000, 2500, 3000, 3500, 4000, 4500, 5000, 5500, 6000, 6500, 7000, or 7500 $mm^3/g$. In some embodiments, the void volume is any of about 100 to about 500, about 200 to about 1000, about 400 to about 800, about 500 to about 1000, about 800 to about 1500, about 1000 to about 2000, about 1500 to about 3000, about 2000 to about 5000, about 3000 to about 7500, about 250 to about 5000, about 350 to about 4000, about 400 to about 3000, about 250 to about 1000, about 250 to about 2500, about 2500 to about 5000, or about 500 to about 4000 mm$^3$/g.

The ceramic deposit layer may be designed to impart one or more functional characteristic as well as providing a binding surface for a functionalizing layer, such as a top coat material.

Applications of Use

Modified substrates (e.g., textiles) as described herein include one or more functional properties that enhance performance in a system or application of use.

For example, the modified substrate may exhibit greater adherence to small molecules (e.g., low molecular weight (e.g., less than 900 Da and/or size 1 nm or less) organic compounds such as drugs or antibiotics) than to biomolecules or components of sebum (e.g., triglycerides, wax esters, squalene, and/or fatty acids). Such a composition may be provided, for example, in the form of a bandage (e.g., cast liner) that is precoated with a drug or biocide and that does not accumulate odor from body oil (sebum).

In another example, the substrate is functionalized to possess a photocatalytic property, and materials that adhere to the surface are photocatalytically degraded when exposed to light. For example, an odor promoting compound, such as a sebum component, may be broken down when exposed to light.

In another example, the composition exhibits greater adherence to a durable water repellent substance than an identical substrate that is not modified with a ceramic material as described herein. Several commercial durable water repellant formulations are fluoropolymer based and can require frequent reapplication to maintain performance, in contrast to the compositions described herein. Other materials include perfluorinated acids, per- and polyfluoroalkyl substances (PFASs), Perfluorobutanesulfonic acid, Perfluorooctanoic acid, Scotchgard and Quarpel. Many of these materials have adverse health and environmental impacts.

Articles that include the compositions described herein are provided. Nonlimiting examples of such articles include filters, membranes, clothing, outerwear, camping gear (e.g., tents, sleeping bags), pipe insulation, carpet, upholstery, car seats (e.g., infant seats), bedding (e.g., waterproof breathable bedding, such as bedsheets), architectural sheathing, footwear, and window coverings.

In one embodiment, the composition is used as a membrane, such as, but not limited to, food packaging. For example, the membrane may serve as a barrier for certain compounds, but allow oxygen and other materials to pass through, or may serve to separate water from air (e.g., water repellent or water retaining), or may separate and retain solids from liquids (e.g., cheesecloth). In other embodiments, the membrane may allow water vapor to pass through, but not liquid water.

The following examples are intended to illustrate, but not limit, the invention.

EXAMPLES

Example 1

Rip-stop nylon was used as the substrate for production of a waterproof, breathable textile material. Woven ripstop nylon was metallized with aluminum via vapor deposition to produce aluminized nylon at aluminum thicknesses from 25 nm to 2000 nm, typically about 300 nm.

The aluminized samples were then coated with a porous magnesium oxide based ceramic that was deposited in a 25 to 75 mM aqueous solution of magnesium nitrate and a similar quantity of hexamethylenetetramine at a temperature of about 60° C. to 80° C. for a time period of about 5 to 90 minutes. The mesh was then calcined at a temperature of about 100° C. to 250° C. for about 1 hour, The deposit structure was imaged to assess uniformity.

The textile was functionalized to impart superhydrophobic properties via batch immersion in hexadecylphosphonic acid for 90 minutes, and then dried at 105° C. for 90 minutes. The samples were tested to AATCC 127 and ASTM E96 standards, and were observed to possess water resistance and water vapor permeability performance superior to existing water-proof breathable commercial products.

Example 2

A stainless steel mesh layer was pitted in an acid etch and then coated with a binderless structured manganese oxide ceramic surface modification that was deposited in a 25 to 75 mM aqueous solution of manganese nitrate and a similar quantity of hexamethylenetetramine or urea at a temperature of about 60° C. to 80° C. for a time period of about 60 to 240 minutes. The mesh was then calcined at a temperature of about 400° C. to 600° C. for about 1 hour, giving the surface hydrophilic properties. The water contact angle was measured to be less than 5 degrees via the sessile drop method. The mesh was placed into a cup with about 1 cm of deionized water. After 2 minutes the capillary rise was determined to be about 3 cm above the liquid level. Capillary rise was determined as described in PCT Application No. PCT/US19/65978 (see, e.g., FIGS. 1A-1C). The vapor transmission rate was determined to be 130 g/hr/m$^2$. The water column breakthrough pressure was tested and the layer was not able to support any measurable height of water column.

Example 3

A stainless steel mesh layer was coated with a ceramic material composed of manganese oxide, using a method similar to the method described in Example 2. The surface was then functionalized using a dilute (about 0.5%) solution of hexadecylphosphonic acid in isopropanol, thereby giving the surface hydrophobic properties. The water contact angle was measured to be 151 degrees via the sessile drop method. The layer was placed into a cup with about 1 cm of deionized water. After 2 minutes there was no appreciable rise of water on the surface above the liquid level. The vapor transmission rate was determined to be 145 g/hr/m$^2$. The water column breakthrough pressure was determined to be 25 cm of water head.

Example 4

A stainless steel mesh layer without any surface preparation was tested. The water contact angle was measured to be 20 degrees via the sessile drop method. The layer was placed into a cup with about 1 cm of deionized water. After 2 minutes there was no appreciable rise of water on the surface above the liquid level. The vapor transmission rate was determined to be 152 g/hr/m$^2$. The water column breakthrough pressure was tested and the layer was not able to support any measurable height of water column.

Example 5

An aluminum mesh layer was coated with a ceramic material composed of magnesium oxide that was deposited in a 25 to 75 mM aqueous solution of magnesium nitrate and a similar quantity of hexamethylenetetramine at a temperature of about 60° C. to 80° C. for a time period of about 30 to 90 minutes. The mesh was then calcined at a temperature of about 300° C. to 600° C. for about 1 hour, thereby giving the surface hydrophilic properties. The water contact angle is measured to be less than 5 degrees via the sessile drop method. The layer is placed into a cup with about 1 cm of deionized water. After 2 minutes the capillary rise was determined to be about 5 cm above the liquid level. The vapor transmission rate was determined to be about 150 g/hr/m$^2$. The water column breakthrough pressure was tested; the layer was not able to support any measurable height of water column.

Example 6

An aluminum mesh (Dutch twill) layer was coated with a ceramic material composed of magnesium oxide, using a procedure similar to the procedure described in Example 5. The surface was then functionalized using a dilute solution of hexadecylphosphonic acid in isopropanol, thereby giving the surface hydrophobic properties. The water contact angle was measured to be 160 degrees via the sessile drop method. The layer was placed into a cup with about 1 cm of deionized water. After 2 minutes there was no appreciable rise of water on the surface above the liquid level. The vapor transmission rate was determined to be 150 g/hr/m$^2$. The water column breakthrough pressure was determined to be about 100 cm of water head.

Example 7

An aluminum mesh layer without any surface preparation was tested. The water contact angle was measured to be 20 degrees via the sessile drop method. The layer was placed into a cup with about 1 cm of deionized water. After 2 minutes there was no appreciable rise of water on the surface above the liquid level. The vapor transmission rate was determined to be 153 g/hr/m$^2$. The water column breakthrough pressure was tested, and the layer was not able to support any measurable height of water column.

Example 8

A 40 d (40 denier) woven polyamide textile layer was coated with a ceramic material composed of magnesium oxide using a method similar to the method described in Example 1, thereby giving the surface hydrophilic properties. The water contact angle was measured to be less than 5 degrees via the sessile drop method. The vapor transmission rate was determined to be 175 g/hr/m$^2$. The water column breakthrough pressure was tested and the layer was not able to support any measurable height of water column.

Example 9

A 40 d woven polyamide textile layer was coated with a ceramic material composed of magnesium oxide. The surface was then functionalized using a dilute solution of hexadecylphosphonic acid in isopropanol, thereby giving the surface hydrophobic properties. The vapor transmission rate was determined to be 170 g/hr/m$^2$. The water column breakthrough pressure was determined to be 55 cm of water head.

Example 10

A 40 d woven polyamide textile layer without any surface preparation was tested. The vapor transmission rate was determined to be 170 g/hr/m$^2$. The water column breakthrough pressure was tested and the layer was not able to support any measurable height of water column.

Example 11

A woven polyester textile and woven nylon textile were sputtered with about 250 nm of aluminum. The textile was cut into smaller pieces and coated with 3 different ceramic materials: a) a magnesium oxide/hydroxide-based ceramic, b) and manganese oxide/hydroxide based ceramic, c) and a zinc oxide/hydroxide based ceramic. All three ceramics contained quantities of aluminum oxide/hydroxide. The ceramics were deposited in methods similar to the method described in Example 1 (using the 2+ metal nitrate or metal sulfate salt for each respective cation found in the ceramic). The samples were tested for contact angle and exhibited a contact angle less than 15 degrees. The ceramic modified textiles were then dip coated into a dilute bath (0.1% to 1%) of hexadecylphosphonic acid in isopropanol or hexadecyltriethoxysilane in ethanol. In the case of the silane, small quantities of an acetic acid catalyst were sometimes used. The samples were then measured for contact angle again and exhibited contact angles of about 150 to 160 degrees. The moisture vapor transmission was within error of the measurement of the unmodified fabric.

Example 12

A woven polyester textile, polyamide textile, and Tencel textile were coated with a zinc oxide based ceramic by dipping the textile in a batch of about 200-500 mM zinc sulfate, about 50-150 mM of potassium persulfate, and about 1.2 to 1.7 molar ammonium hydroxide for about 5 to 60 minutes at room temperature. Nickel oxide deposits were also created on polyester by substituting the zinc sulfate with nickel sulfate. Manganese oxide deposits were also created on polyester by substituting the zinc sulfate with manganese sulfate and substituting the persulfate with a permanganate. These samples were then dried at a temperature of about 105 C to about 140 C for a duration of about 1 to 2 hours. The samples were tested for contact angle and exhibited a contact angle less than 15 degrees. The ceramic modified textiles were then dip coated into a dilute bath (0.1% to 1%) of hexadecylphosphonic acid in isopropanol or hexadecyltriethoxysilane in ethanol. In the case of the silane, small quantities of an acetic acid catalyst were sometimes used. The samples were then measured for contact angle again and exhibited contact angles of about 150 to 160 degrees.

Example 13

Woven polyamide and polyester textiles were submerged in baths of an oxidizer to activate the surface. Typical oxidation procedures include submerging the textile in a aqueous bath of potassium persulfate or potassium permanganate at a concentration of about 5 mM to about 200 mM and ammonium hydroxide at a concentration of about 10 mM to about 400 mM. Typical baths had about a 1:2 molar ratio of potassium permanganate or potassium persulfate to ammonium hydroxide. The oxidation temperatures ranged from about room temperature to about 80 C.

Example 14

Woven polyester and polyamide textiles are oxidized in UV/ozone and/or an oxygen plasma, resulting in better adhesion of a structured ceramic layer.

Example 15

Woven polyamide and polyester textiles were submerged in an aqueous bath of about 5 to 200 mM of potassium permanganate and about 10 to 400 mM of ammonium hydroxide at a temperature of about room temperature to about 80 C for about 5 minutes to about 1 hour. Typical ratios of permanganate to ammonium hydroxide were about 1 to 2. The substrate was then allowed to dry and then deposited with a structured ceramic layer comprising manganese oxides/hydroxides, zinc oxides/hydroxides, or magnesium oxides/hydroxides by dipping the substrate in a 25 to 150 mM aqueous solution of metal (Mn, Zn, or Mg) nitrate and a similar quantity of hexamethylenetetramine at a temperature of about 60° C. to 80° C. for a time period of about 5 to 90 minutes. The mesh was then dried at a temperature of about 100° C. to 250° C. for about 1 hour. These contact angle of the samples was measured and determined to be less than about 15 degrees. The ceramic modified textiles were then dip coated into a dilute bath (0.1% to 1%) of hexadecylphosphonic acid in isopropanol or hexadecyltriethoxysilane in ethanol. In the case of the silane, small quantities of an acetic acid catalyst were sometimes used. The samples were then measured for contact angle again and exhibited contact angles of about 150 to 160 degrees.

Although the foregoing invention has been described in some detail by way of illustration and examples for purposes of clarity of understanding, it will be apparent to those skilled in the art that certain changes and modifications may be practiced without departing from the spirit and scope of the invention, which is delineated in the appended claims. Therefore, the description should not be construed as limiting the scope of the invention.

All publications, patents, and patent applications cited herein are hereby incorporated by reference in their entireties for all purposes and to the same extent as if each individual publication, patent, or patent application were specifically and individually indicated to be so incorporated by reference.

We claim:

1. A composition comprising a binderless ceramic material on a porous polymeric substrate,
    wherein the composition comprises a partially filled porous structure wherein pores of the porous polymeric substrate are partially filled with the ceramic material, wherein the ceramic material is directly bonded to the porous polymeric substrate, and wherein the partially filled porous structure is modified with a functional layer,
    wherein the porous polymeric substrate comprises a woven material, a knitted material, a nonwoven fabric or textile, or paper,
    wherein the functional layer comprises a molecule with a head group and a tail group and imparts a hydrophobic property to the composition,
    wherein the head group of the functional molecule comprises a silane group, a phosphonate group, a phosphonic acid group, a carboxylic acid group, an alcohol group, a hydroxyl group, a thiolate group, a thiol group, and/or an ammonium group, and
    wherein the tail group of the functional molecule comprises a hydrocarbon group, a fluorocarbon group, a vinyl group, a phenyl group, an epoxide group, an acrylic group, and/or an acrylate group.

2. The composition according to claim 1, wherein the porous polymeric substrate comprises pores with a mean pore diameter that is less than about 250 µm, and wherein the ceramic material that partially fills the pores does not substantially change the mean pore diameter.

3. The composition according to claim 1, wherein the porous polymeric substrate comprises pores with a mean pore diameter that is less than about 250 µm, and wherein the ceramic material that partially fills the pores reduces the mean pore diameter.

4. The composition according to claim 1, wherein the porous polymeric substrate comprises an air permeability of about 0.1 cubic feet per minute (CFM) to about 100 CFM according to ASTM D737.

5. The composition according to claim 1, wherein the ceramic material is primarily crystalline.

6. The composition according to claim 1, wherein the ceramic material comprises a metal oxide, a hydrate of a metal oxide, a metal hydroxide, a hydrate of a metal hydroxide, and/or a layered double hydroxide.

7. The composition according to claim 1, wherein the ceramic material comprises a nanostructured ceramic material.

8. The composition according to claim 1, wherein the ceramic material comprises a transition metal, a Group II element, a rare-earth element, aluminum, tin, or lead.

9. The composition according to claim 8, wherein the ceramic material comprises a thickness up to about 25 µm, and/or a porosity of about 5% to about 80%.

10. The composition according to claim 1, wherein the porous polymeric substrate comprises polyamide, polyester, cotton, wool, polyethylene, polypropylene, a cellulosic material, an aramid, or polyurethane.

11. The composition according to claim 1, wherein the binderless ceramic material imparts one or more functional property to the composition.

12. The composition according to claim 11, wherein the one or more functional property comprises hydrophilicity, hydrophobicity, flame retardancy, photocatalysis, anti-fouling, deodorant properties, inhibition of microbial growth, ice or condensate management, anti-ice, anti-frost, superhydrophobicity, superhydrophilicity, corrosion resistance, electromagnetic modulation, thermal modulation, breathability, dynamic wind resistance, and/or color.

13. The composition according to claim 12, wherein the binderless ceramic material imparts two or more of said functional properties the composition.

14. The composition according to claim 1, wherein the functional layer imparts one or more functional property that is of greater magnitude than the same functional property imparted by an identical functional layer material deposited directly on an identical porous polymeric substrate that does not comprise the ceramic material, and/or wherein the ceramic material and the functional layer synergistically impart one or more functional property that is of greater magnitude than the same functional property imparted by either the ceramic material or the functional layer material deposited independently on an identical porous polymeric substrate.

15. The composition according to claim 1, wherein the ceramic material comprises a photocatalytic property, and wherein materials that adhere to the surface of the composition are photocatalytically degraded on exposure to light.

16. The composition according to claim 1, wherein the composition is more adherent to a durable water repellent substance than an identical porous polymeric substrate that does not comprise the ceramic material.

* * * * *